UNITED STATES PATENT OFFICE.

HIROSHI NOMURA, OF SENDAI, JAPAN.

METHOD OF EXTRACTING A PUNGENT PRINCIPLE FROM GINGER ROOT.

1,306,710.  Specification of Letters Patent.  Patented June 17, 1919.

No Drawing.  Application filed June 6, 1917. Serial No. 173,113.

*To all whom it may concern:*

Be it known that I, HIROSHI NOMURA, professor of chemistry, a subject of the Emperor of Japan, residing at No. 30 Kadan, city of Sendai, Miyagi Prefecture, Empire of Japan, have invented a certain new Method of Extracting a Pungent Principle from Ginger Root, (*Zingiber officinale*,) to which I gave the name "zingiberone."

After careful examination I have found the chemical constitution of this substance to be

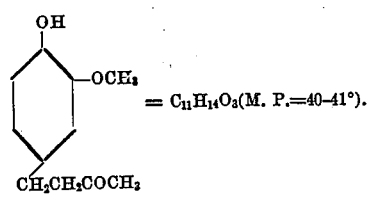

The result was fully verified by the synthetical preparation of this substance by the catalytic reduction of vanillalacetone which is obtainable by the condensation of vanillin and acetone in presence of caustic alkali, according to the following action:

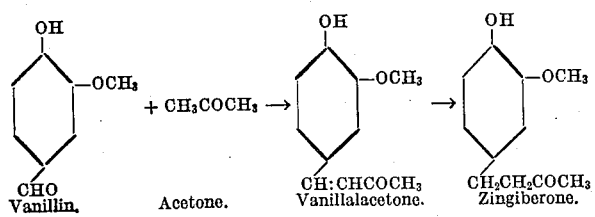

The procedure of extracting zingiberone from ginger root is illustrated as follows:—

367 kilograms of dry powdered ginger were extracted with ether in the cold and the ethereal extract was evaporated to a syrupy consistency. The syrup was dissolved in a small quantity of ether and shaken with 2% caustic soda solution for three hours. The quantity of caustic soda solution required for the extraction of the pungent principles from the syrup was determined by a preliminary experiment. 500 c. c. of 2% caustic soda solution were necessary for 100 grams of the syrup. The pungent principles in alkaline solution were deposited by means of carbon dioxid free from hydrochloric acid and extracted with ether. The ethereal solution was washed with sodium carbonate solution (2N) to make it free from acidic substance, and, then, with water until the alkaline reaction disappeared, dried over anhydrous sodium sulfate and evaporated. The yield of residual oil was about 1% of the original ginger. It was distilled under a reduced pressure of 0.5–1 mm. until the temperature of the oil bath reached 320°, after the previous distillation of volatile substance under 13–23 mm. All the distillate was diluted with ether and shaken with an excess of a concentrated solution of sodium bisulfite, which separated the compound of bisulfite and zingiberone. The bisulfite compound was filtered by means of a pump, washed with ether until the washing was colorless, and decomposed with a concentrated solution of sodium carbonate. The oil separated in this decomposition was extracted with ether, the ethereal solution washed several times with water, dried over anhydrous sodium sulfate and evaporated. The yield of oil thus obtained was 0.04% of the original material. On cooling under continuous agitation with the addition of minute quantity of zingiberone the oil solidified to a somewhat brownish mass, which became colorless needles and melted at 40–41° after recrystallization from petroleum ether (B. P. 50–70°) or a mixture of ether and petroleum ether.

The analysis of the colorless crystals thus obtained corresponds to the empirical formula $C_{11}H_{14}O_3$.

The molecular weight determined by the cryoscopic method in benzene solution gave M. W.=189, while $C_{11}H_{14}O_3$ requires M. W.=194.

The presence of one methoxyl group in this substance was shown by Zeisel's method.

Zingiberone gives a red coloration with Millon's reagent, dissolves to a green colored solution with an alcoholic ferric chlorid and reduces ammonical silver nitrate solution on warming. There is no visible decomposition on shaking zingiberone with 2% caustic soda for several hours.

Having now described my invention, what I claim is:—

1. A new pungent principle "zingiberone" (methyl 3-methoxy-4-hydroxyphenylethyl ketone) of ginger root (*Zingiber officinale*) which has the chemical formula

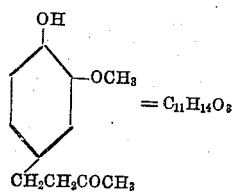

and the characteristics of crystallizing in colorless needles, soluble in ether, 50% alcohol and melting at 40–41°.

2. The method of extracting a pungent principle from ginger root comprising extracting the ginger with a solvent in which the pungent principle of ginger is soluble, then evaporating the solution to the consistency of syrup, then dissolving the syrup in a solvent in which the pungent principle of ginger is soluble, then precipitating a compound of the pungent principle by the addition of carbon dioxid to the solution, then dissolving the precipitate in a solvent in which the pungent principle is soluble, then evaporating this last solution to the consistency of a syrup, then distilling the syrup, then treating the distillate with sodium bisulfite to obtain a compound of bisulfite and the pungent principle, then dissolving the pungent principle compound in a solvent in which the pungent principle is soluble, and finally crystallizing the principle of the last obtained solution.

3. The method of extracting a pungent principle from ginger root comprising extracting powdered ginger with a solvent in which the pungent principle of ginger is soluble, then evaporating the solution to the approximate consistency of syrup, then dissolving the syrup in a solvent in which the pungent principle is soluble and shaking the solution with an alkaline solution, then precipitating a compound of the principle of the solution by the addition thereto of carbon dioxid, then dissolving the precipitate in a solvent in which the pungent principle is soluble, and washing the solution obtained thereby to free the same from acid and alkali, then evaporating the washed solution to the consistency of syrup, then distilling the syrup, then precipitating from the distillate a compound of the principle and precipitating agent employed, then decomposing the precipitate with sodium carbonate into the form of an oil, then extracting the oil and washing the same, then evaporating the resultant oil, dissolving the evaporated oil in ether and finally crystallizing the principle from the mass.

4. The method of extracting a pungent principle from ginger root comprising extracting powdered ginger with ether and evaporating the solution to the approximate consistency of syrup, then dissolving the syrup in ether and shaking the ether solution with a 2% solution of caustic soda, then precipitating the pungent principle by means of carbon dioxid, and then dissolving the precipitate in ether, then washing the solution with a sodium carbonate solution to free the same from acid, then washing the solution with water to free the same from alkali, then drying and evaporating the solution to the consistency of syrup, then distilling the syrup, then adding sodium bisulfite to an ether solution of the distillate to obtain a compound of bisulfite and the pungent principle, then filtering out the resulting compound and decomposing the same with sodium carbonate, then extracting the oil produced by the decomposition with ether, washing with ether, drying and evaporating the same, then cooling the oil, and finally recrystallizing the pungent principle from petroleum ether.

In testimony whereof I affix my signature in presence of two witnesses.

HIROSHI NOMURA.

Witnesses:
H. F. HAWLEY,
M. MOCHIGOKI.